US006793511B2

United States Patent
Murayama et al.

(10) Patent No.: US 6,793,511 B2
(45) Date of Patent: Sep. 21, 2004

(54) CARD CONNECTOR DEVICE PROVIDED WITH A SWITCH FOR DETECTING MOUNTING OF CARDS IN PREDETERMINED MOUNT POSITIONS

(75) Inventors: Takeshi Murayama, Miyagi-ken (JP); Atsushi Uchiyama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 4 days.

(21) Appl. No.: 10/714,242

(22) Filed: Nov. 13, 2003

(65) Prior Publication Data

US 2004/0106315 A1 Jun. 3, 2004

(30) Foreign Application Priority Data

Nov. 29, 2002 (JP) ........................................ 2002-347674

(51) Int. Cl.[7] .............................................. H01R 29/00
(52) U.S. Cl. ........................ 439/188; 439/630; 235/441
(58) Field of Search ................................. 439/188, 630; 235/441

(56) References Cited

U.S. PATENT DOCUMENTS 5,370,544 A    12/1994  Reichardt et al.
6,390,836 B1 * 5/2002  Motegi et al. .............. 439/159
6,478,595 B2 * 11/2002 Nishioka .................... 439/188
6,488,528 B2 * 12/2002 Nishioka .................... 439/489
6,592,385 B1 * 7/2003  Chen ......................... 439/159
6,652,300 B2 * 11/2003 Nishioka .................... 439/159

* cited by examiner

Primary Examiner—Gary Paumen
(74) Attorney, Agent, or Firm—Beyer Weaver & Thomas, LLP (57) ABSTRACT

A card connector device capable of detecting mounting of cards in predetermined mount positions without the provision of metallic sheet pieces comprises a first switch for detecting that a first card and a second card have been mounted in predetermined mount positions and a second switch for detecting inhibition of writing on the first card and the second card, the first switch and the second switch, respectively, including a fixed contact composed of contact portions provided on a housing, a fixed contact composed of contact portions, and a moving contact, which acts as the first and second cards are moved to predetermined mount positions, the respective moving contacts comprising torsion coil springs.

7 Claims, 8 Drawing Sheets

CARD CONNECTOR DEVICE PROVIDED WITH A SWITCH FOR DETECTING MOUNTING OF CARDS IN PREDETERMINED MOUNT POSITIONS

BACKGROUND OF THE INVENTION

1. Field of the Invention

The present invention relates to a card connector device provided with a switch mechanism, which comprises a first switch for detecting that cards have been mounted in predetermined mount positions and a second switch for detecting inhibition of writing on cards.

2. Description of Related Art

In this kind of prior art, a folded type contact spring piece is provided on an inner side position outside a card insertion part to constitute a card recognition switch, that is, a first switch for detecting that cards have been mounted in predetermined mount positions. Also, with the prior art, a contact spring piece composed of a relatively lengthy metallic sheet piece is provided laterally of the card insertion part to constitute a write protect detection switch, that is, a second switch for detecting inhibition of writing on cards (see, for example, Patent document 1).

In addition to the above-mentioned prior art, the first switch for detecting that cards have been mounted in predetermined mount positions is conventionally composed of a relatively lengthy metallic sheet piece in the same manner as the second switch, and the first switch and the second switch are arranged linearly in a direction of card taking-out and putting-in.

Patent Document 1

Japanese Unexamined Published Patent Application No. H2001-135383 (pages 3 to 5, FIGS. 5 to 9)

With the art described in the document, the second switch, which must be set large in length in order to ensure a desired spring quality, is provided laterally of the card insertion part, and the first switch is provided on an inner side position outside the card insertion part. This is liable to lead to lengthening of a depth of the device, and so it is difficult to realize miniaturization of the device.

In addition, with the art described in the document, since it is necessary to provide a projection, which engages with a card, on a tip end of the second switch, it is necessary to set a moving region of the second switch, and further a distal end of the second switch is liable to be formed in a complicated form in view of mounting on a housing, a dimension of the device in a widthwise direction perpendicular to the direction of card taking-out and putting-in is liable to be increased, and from this point of view, it is difficult to realize miniaturization of the device.

Also, with the prior art, in which the first switch and the second switch are arranged on the same straight line laterally of the card insertion part, a depth dimension of the device is increased as compared with the technique described in the document, and so it is not possible to realize miniaturization of the device. In addition, for the same reason as described above, a widthwise dimension of the device is liable to be increased, in which point it is difficult to realize miniaturization of the device.

Also, either art described above, in which metallic sheet pieces are used to make the first switch and the second switch, involves a problem that complicated processings such as punching of a flat sheet hoop material, cutting, or the like, are necessary at the time of manufacture and therefore an increase in manufacturing cost is caused.

SUMMARY OF THE INVENTION

The invention has been thought of in view of situation in the prior art described above, and has its object to provide a card connector device capable of detecting mounting of cards in predetermined mount positions without the provision of metallic sheet pieces.

Also, it is a second object to provide a card connector device capable of detecting inhibition of writing on cards without the provision of metallic sheet pieces.

In order to attain the first object, the invention provides a card connector device comprising a switch for detecting that cards have been mounted in predetermined mount positions, the switch comprising a fixed contact provided on a housing and a moving contact to act as the cards are moved to the predetermined mount positions, the moving contact comprising a torsion coil spring.

With the invention constituted in this manner, the torsion coil spring begins deformation as the cards move to the predetermined mount positions, and when the cards reach the predetermined mount positions, deformation of the torsion coil spring provides continuity between the torsion coil spring and the fixed contact, and so it is detected that that cards have been mounted in the predetermined mount positions. That is, mounting of the cards in the predetermined mount positions can be detected through deformation of the torsion coil spring without the provision of metallic sheet pieces. In order to set a spring force of the torsion coil spring constituting the moving contact, it suffices to take account of wire diameter, number of turns, and so on, and accordingly total lengths of the torsion coil springs can be set to short lengthwise dimensions as compared with relatively lengthy metallic sheet pieces described above. Also, since the torsion coil springs having small number of turns provide desired spring forces, they can be set to be small in widthwise dimension, moving regions, and so on, as compared with metallic sheet pieces, which are liable to become large in widthwise dimension.

Also, the invention adds to the above invention a feature that the fixed contact comprises contact portions arranged in opposition to each other at a predetermined spacing therebetween, and as the cards are moved to the predetermined mount positions, both ends of the torsion coil spring are expanded to provide continuity between the contact portions.

With the invention constituted in this manner, when the cards reach the predetermined mount positions, both ends of the torsion coil spring thus expanded provides continuity between the contact portions of the fixed contact whereby a signal indicating that the cards have been mounted in the predetermined mount positions is output.

Also, the invention adds to the above invention a feature that an actuator member, which is made of a resin to hold the torsion coil spring and with which the cards are engagable, is provided and the torsion coil spring is expanded concurrently with actuation of the actuator member caused by movements of the cards.

With the invention constituted in this manner, when the cards reach the predetermined mount positions, both ends of the torsion coil spring expanded by the actuator member, which is actuated by movements of the cards causes, provides continuity between the contact portions.

Also, the invention adds to the above invention a feature that support means supporting the actuator member vertically swingably is provided and the actuator member comprises a slope pushed by the cards.

With the invention constituted in this manner, the slope on the actuator member is pushed by the cards as the cards are moved to the predetermined mount positions, whereby the actuator member is turned, so that both ends of the torsion coil springs are expanded to provide continuity between the contact portions of the fixed contact. That is, contact between the cards and the actuator member made of a resin makes it possible to expand the torsion coil springs.

Also, in order to attain the second object, the invention provides a card connector device comprising a switch for detecting inhibition of writing on cards, the switch comprising a fixed contact provided on a housing and a moving contact to act as the cards are moved to the predetermined mount positions, the moving contact comprising a torsion coil spring.

With the invention constituted in this manner, when the cards are subjected to the processing of inhibition of writing, the torsion coil spring deforms as the cards are moved, and such deformation provides continuity between the torsion coil spring and the fixed contact, so that inhibition of writing on the cards is detected. That is, inhibition of writing on cards can be detected through deformation of the torsion coil spring without the provision of metallic sheet pieces. In order to set a spring force of the torsion coil spring constituting the moving contact, it suffices to take account of wire diameter, number of turns, and so on, and accordingly total lengths of the torsion coil springs can be set to short lengthwise dimensions as compared with relatively lengthy metallic sheet pieces described above. Also, since the torsion coil springs having small number of turns provide desired spring forces, they can be set to be small in widthwise dimension, moving regions, and so on, as compared with metallic sheet pieces, which are liable to become large in widthwise dimension.

Also, the invention adds to the above invention a feature that a separate switch for detecting that the cards have been mounted in predetermined mount positions is provided, and the separate switch comprises a separate fixed contact provided on a housing and a separate moving contact to act as the cards are moved to the predetermined mount positions, the separate moving contact comprising a separate torsion coil spring.

With the invention constituted in this manner, in addition to affording detecting inhibition of writing on cards described above, the separate torsion coil spring deforms as the cards are moved to the predetermined mount positions. When the cards reach the predetermined mount positions, it is detected from deformation of the separate torsion coil spring that continuity is provided between the separate torsion coil spring and the separate fixed contact and the cards have been mounted in the predetermined mount positions. That is, mounting of the cards in the predetermined mount positions can be detected through deformation of the separate torsion coil spring without the provision of metallic sheet pieces.

Also, the invention adds to the above invention a feature that the switch for detecting inhibition of writing on cards and the separate switch are arranged linearly in a direction of card taking-out and putting-in, and the switch for detecting inhibition of writing on cards is positioned on a side close to a card insertion slot and the separate switch is positioned on a side distant from the card insertion slot.

With the invention constituted in this manner, the switch mechanism can be arranged in a compact configuration in the direction of card taking-out and putting-in.

BRIEF DESCRIPTION OF THE DRAWINGS

FIGS. 8A and 8B are views showing a switch mechanism according to the embodiment, FIG. 8A being a side, cross sectional view taken along the line B—B in FIG. 7A and showing a state, in which a first switch is made ON and a second switch is made OFF, and FIG. 8B being a side, cross sectional view taken along the line C—C in FIG. 7A and showing a state, in which the first switch is made OFF and the second switch is made ON.

DESCRIPTION OF PREFERRED EMBODIMENTS

An embodiment of a card connector device according to the invention will be described below with reference to the drawings.

Basic Constitution

Figure 1:
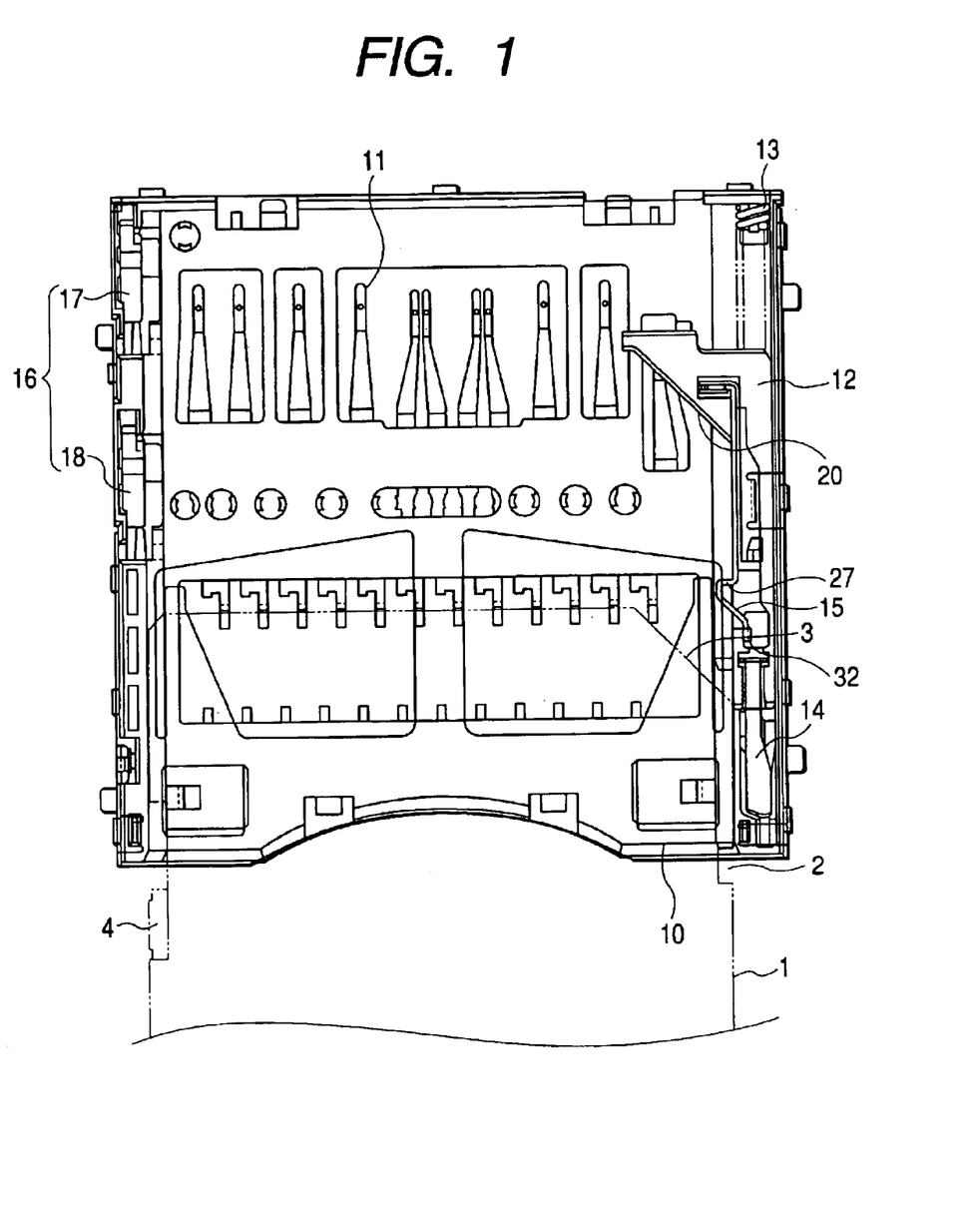
FIG. 1 is a plan view showing a basic configuration of an embodiment of a card connector device according to the invention.

FIG. 1 is a view showing a basic configuration of the embodiment of the card connector device according to the invention.

First, two kinds of cards usable in the embodiment are described. Both these cards have the information storage function. As shown in FIG. 1, the first card 1 is formed at a right side edge thereof with a recess 2. Also, a oblique cut notch 3 is provided in a right corner on a front end. Further, a protect button 4 is provided on a left side edge to inhibit writing on the first card 1. FIG. 1 shows a state, in which the protect button 4 is operated to a write inhibit side. In this manner, when the protect button 4 is operated to the write inhibit side, writing on the first card 1 is inhibited. Also, when the protect button 4 is not operated to the write inhibit side, writing on the first card 1 is made possible.

In the embodiment, a second card 5 described later, of which side edge is not formed with any recess, is usable in addition to the first card 1 described above. Also, the second card 5 is also provided with a notch 6 similar to the notch 3 on the first card 1. Also, a protect button similar to the protect button 4 is provided.

The first card 1 and the second card 5 are set substantially equal in widthwise dimension, that is, dimensions in a direction perpendicular to a direction of card taking-out and putting-in are set substantially equal.

As shown in FIG. 1, a card insertion slot 10, through which the first card 1 and the second card 5 are inserted, is formed on this side portion of the card connector device according to the embodiment. Provided on an inner side of the device are a plurality of terminal members 11 to be able to contact with connection members formed on back surfaces of the first card 1 and the second card 5 to be connected to an external signal system.

As shown in FIG. 1, provided on, for example, a right end of the device are a slider 12 for pushing out the first card 1 and the second card 5 in an eject direction, and a bias member 13 for biasing the slider 12 in the eject direction. Provided on a front end side of the slider 12 is a slope 20 for engagement with the notch 3 on the first card 1 and the notch 6 on the second card 5.

Also, provided is an engagement elastic member 15, one end of which is cantilevered on the slider 12 and the other end of which forms a free end 32, and which comprises a projection 27 to engage with the recess 2 of the first card 1 to support the first card 1. Further, as described later, a lock mechanism 14 described later is provided to lock the slider 12 in a predetermined mount position, in which signals can be received by and transmitted from the first card 1 and the second card 5, against the bias of the bias member 13.

A switch mechanism 16 described later is provided on a left end of the device. The switch mechanism 16 comprises a first switch 17 for detecting that the first card 1 and the second card 5 have been mounted in predetermined mount positions, and a second switch 18 for detecting inhibition of writing on the first card 1 and the second card 5. For example, the first switch 17 and the second switch 18 are arranged in the direction of card taking-out and putting-in, that is, linearly in a longitudinal direction in FIG. 1. Also, the second switch 18 for detecting inhibition of writing on the card is positioned on a side close to the card insertion slot 10, and the first switch 17 is positioned on a side distant from the card insertion slot 10.

Lock Mechanism

FIGS. 2 to 5B are views showing the engagement elastic member and the lock mechanism provided in the embodiment.

Figure 2:
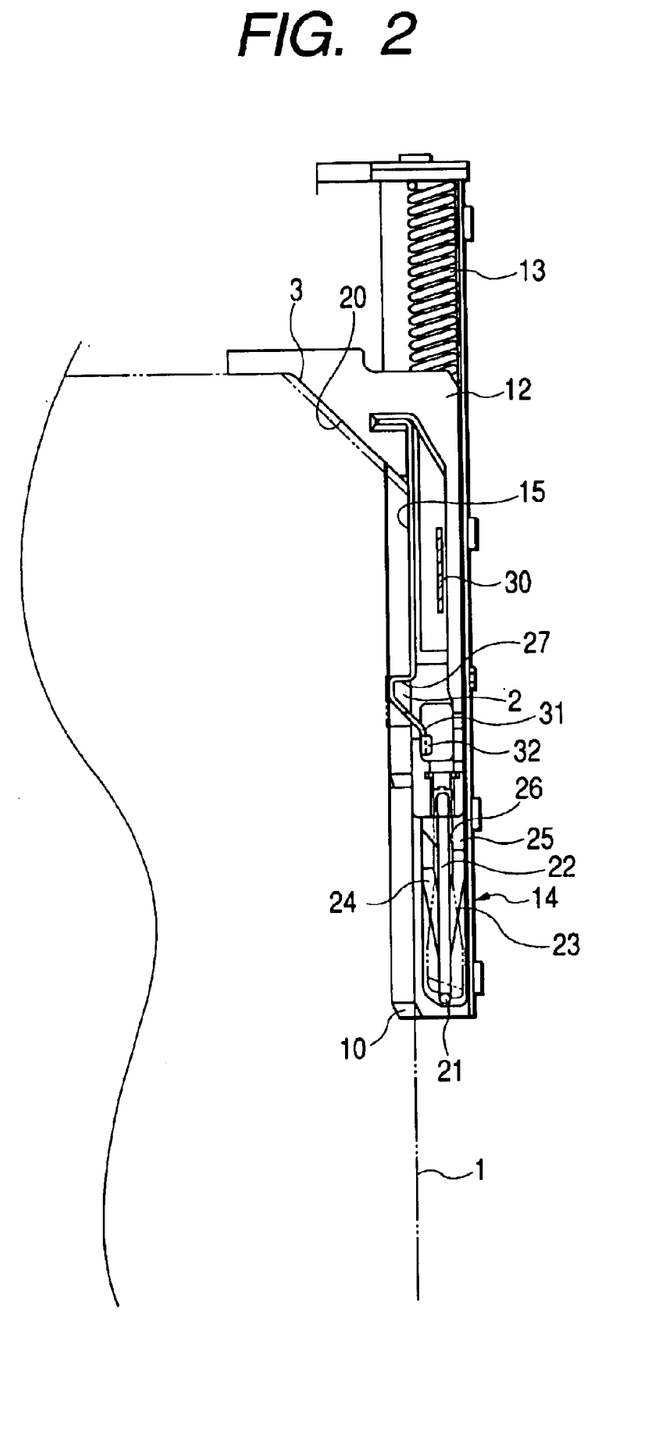
FIG. 2 is a view showing an engagement elastic member and a lock mechanism, which are provided in the embodiment to hold a card, and a state at the time of insertion, when a first card formed at a side edge thereof with a recess is inserted into the embodiment.
Figure 3A:
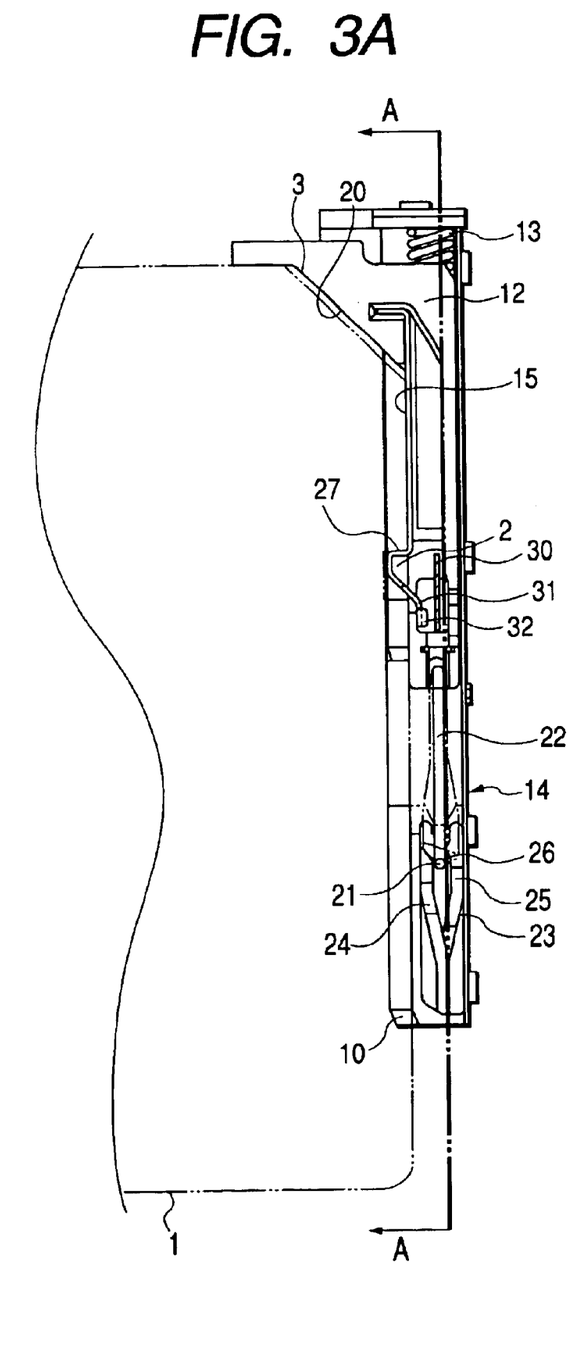
FIGS. 3A and 3B are views showing an engagement elastic member and a lock mechanism provided in the embodiment and a state, in which the first card is pushed in further from the state shown in FIG. 2 to be held in a predetermined mount position, FIG. 3A being a plan view showing an essential part, and FIG. 3B being a side view as viewed from the line A—A in FIG. 3A.
Figure 3B:
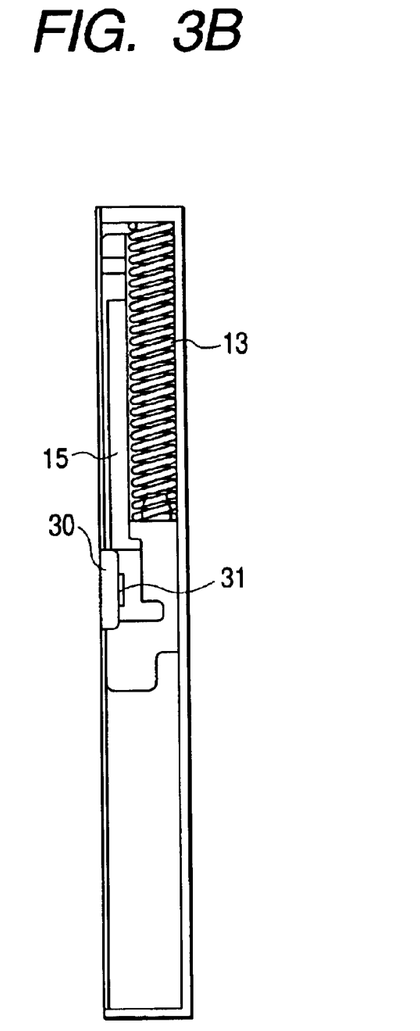

FIG. 2 is a view showing a state at the time of insertion, when the first card 1 formed at the side edge thereof with the recess 2 is inserted. FIGS. 3A and 3B are views showing a state, in which the first card 1 is pushed in further from the position shown in FIG. 2 to be held in a predetermined mount position, FIG. 3A being a plan view showing an essential part, and FIG. 3B being a side view as viewed from the line A—A in FIG. 3A.

Figure 4:
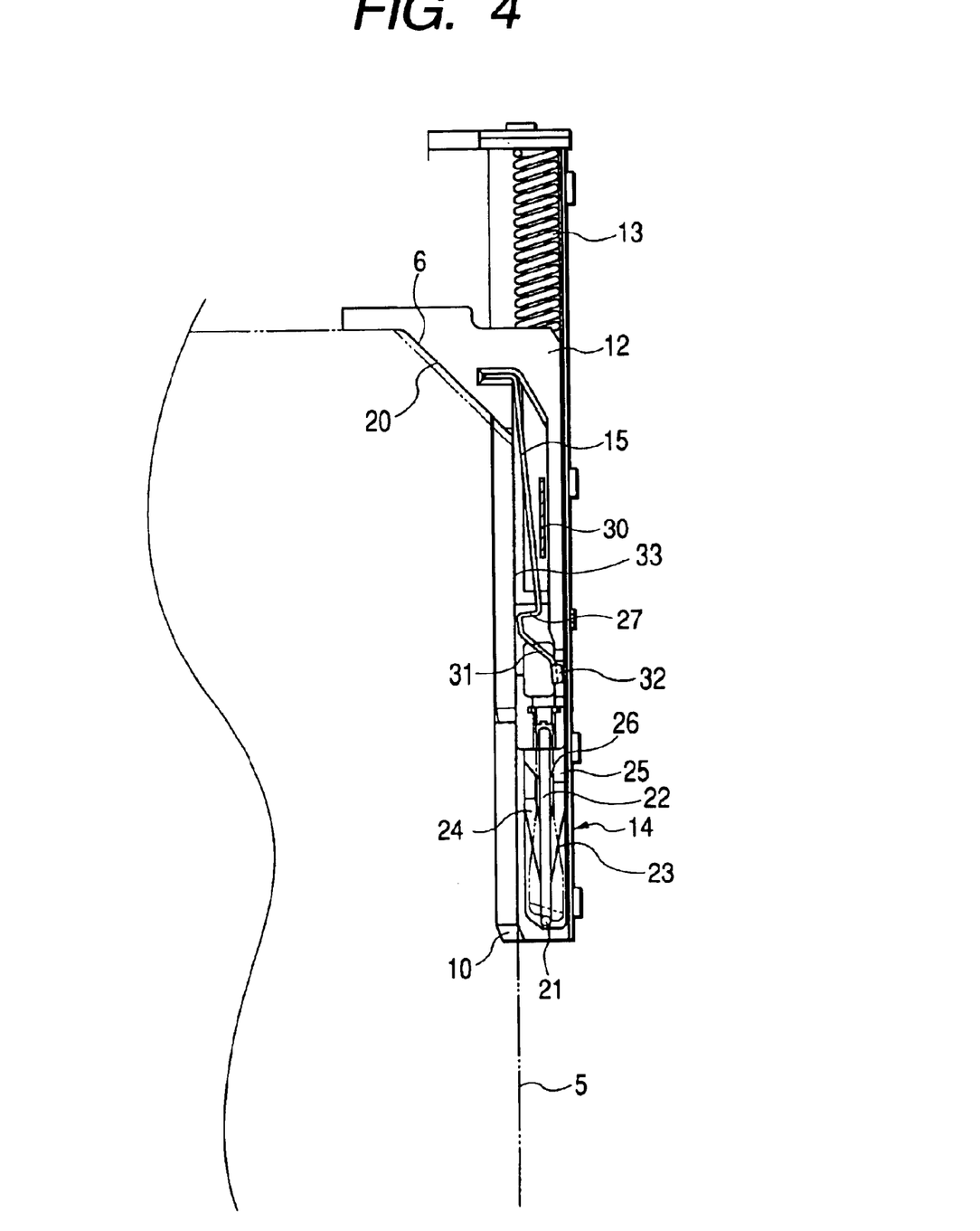
FIG. 4 is a view showing an engagement elastic member and a lock mechanism provided in the embodiment and a state at the time of insertion, when a second card formed at a side edge thereof with no recess is inserted into the embodiment.
Figure 5A:
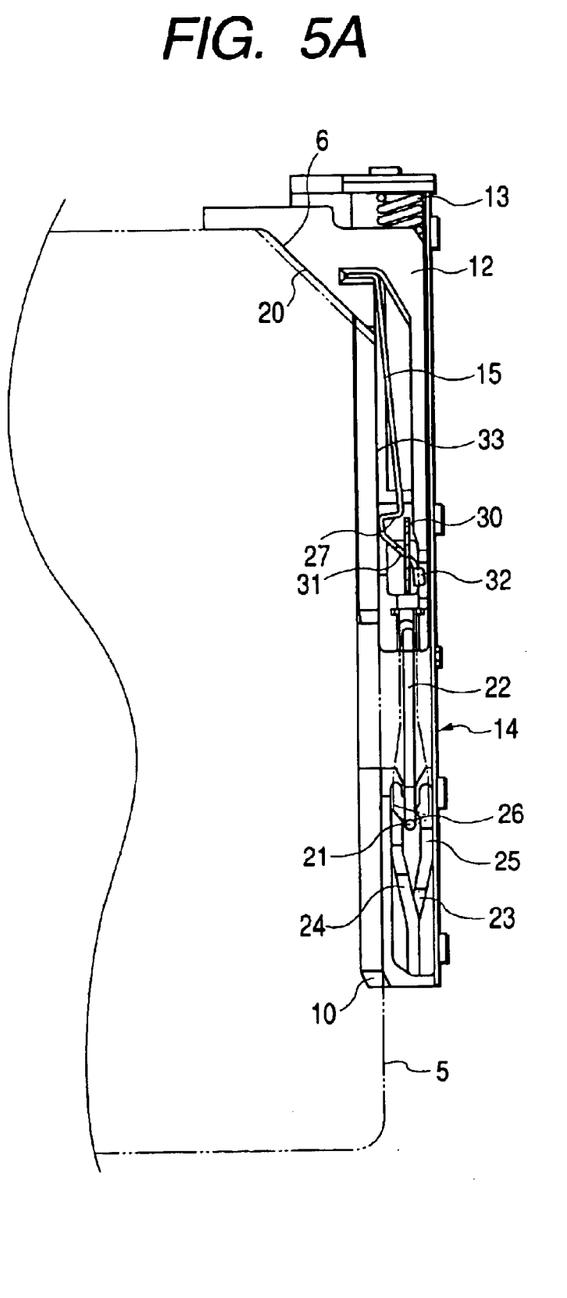
FIGS. 5A and 5B are views showing an engagement elastic member and a lock mechanism provided in the embodiment and a state, in which the second card is pushed in further from the state shown in FIG. 4 to be held in a predetermined mount position, FIG. 5A being a plan view corresponding to FIG. 3A and showing an essential part, and FIG. 5B being a side view corresponding to FIG. 3B.
Figure 5B:
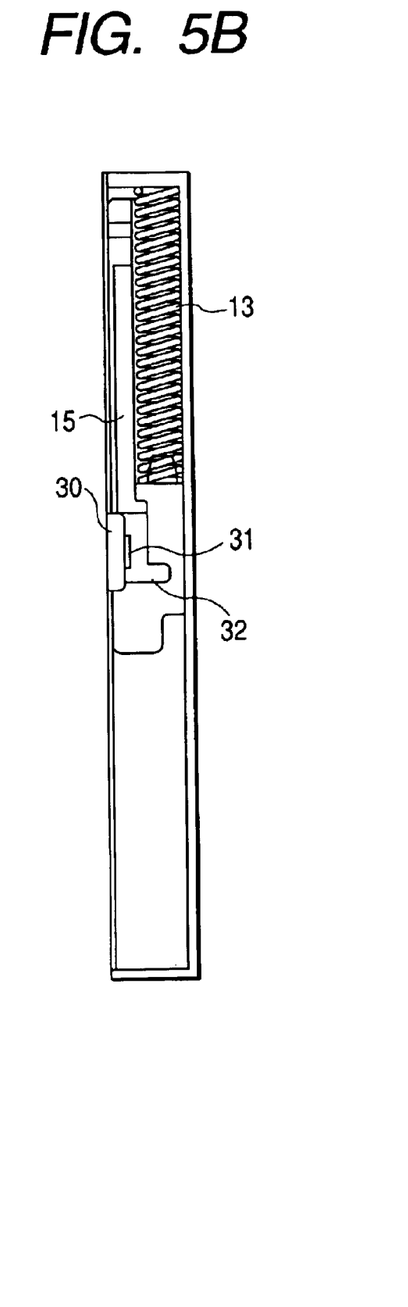

FIG. 4 is a view showing a state at the time of insertion, when the second card 5 formed at the side edge thereof with no recess is inserted, in the embodiment. FIGS. 5A and 5B are views showing a state, in which the second card 5 is pushed in further from the position shown in FIG. 4 to be held in a predetermined mount position, FIG. 5A being a plan view corresponding to FIG. 3A and showing an essential part, and FIG. 5B being a side view corresponding to FIG. 3B.

As shown in FIGS. 2 to 5B, the lock mechanism 14 described above comprises a slide member 22, one end of which is swingably provided on the slider 12 and the other end of which is provided with a pin 21, and a heart-shaped cam groove 23, in which the pin 21 of the slide member 22 is guided.

The heart-shaped cam groove 23 comprises a forward path 24, a rearward path 25, and a lock 26 forming a boundary between the forward path 24 and the rearward path 25.

Restraint Portion and Restraint Release Means

The embodiment comprises a restraint portion for restraining separation of the engagement elastic member 15 from the recess 2 of the first card 1 in a state, in which the first card 1 is mounted in the predetermined mount position. The restraint portion comprises, as shown in, for example, FIGS. 3A and 3B, a wall portion 30 provided on the housing for restraining movements of a free end 32 of the engagement elastic member 15 in a state, in which the first card 1 is mounted in the predetermined mount position.

Also, the embodiment comprises restraint release means for releasing restraint of the restraint portion, that is, the wall portion 30 on the engagement elastic member 15 when the second card 5 formed at the side edge thereof with no recess is inserted. The restraint release means comprises allowance means for allowing the free end 32 of the engagement elastic member 15 to move outwardly of the wall portion 30 when the second card 5 is inserted. The allowance means comprises, as shown in, for example, FIGS. 5A and 5B, a notch 31 provided on the engagement elastic member 15 to prevent interference between the engagement elastic member 15 and the wall portion 30. A lower end of the wall portion 30 can be received in the notch 31.

Switch Mechanism

Figure 6A:
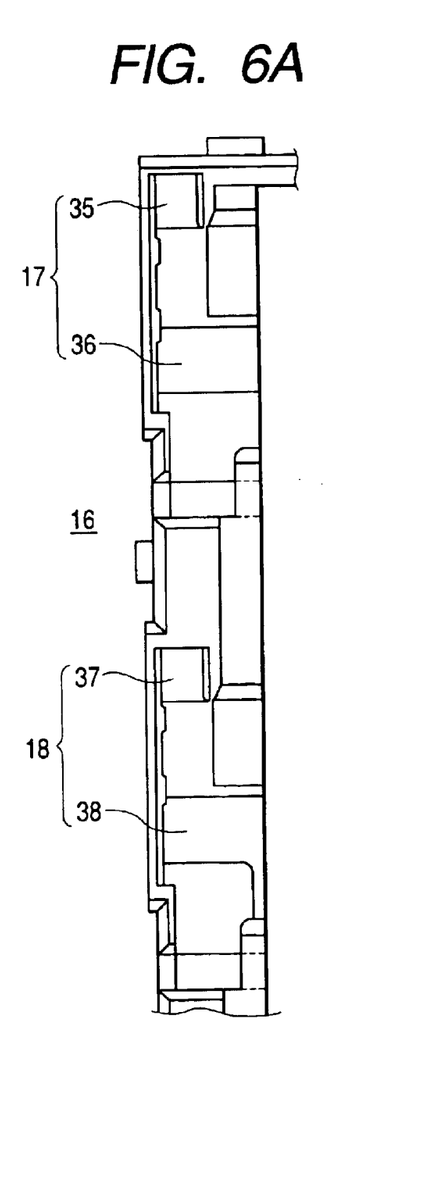
FIGS. 6A and 6B are views showing fixed contact portions provided in the embodiment to constitute a switch mechanism, FIG. 6A being a plan view showing an essential part, and FIG. 6B being a side view.
Figure 6B:
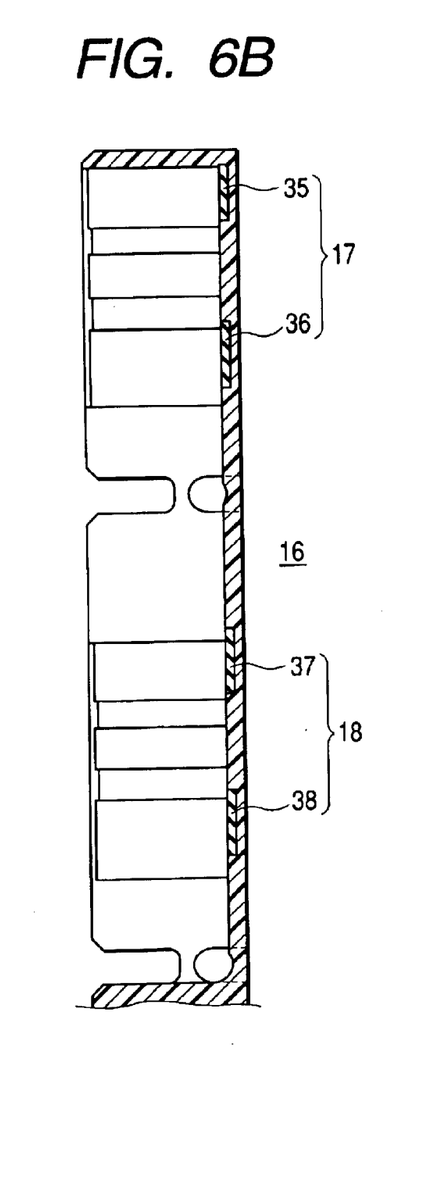

FIGS. 6A and 6B are views showing fixed contacts provided in the embodiment to constitute a switch mechanism, FIG. 6A being a plan view showing an essential part, and FIG. 6B being a side view.

Figure 7A:
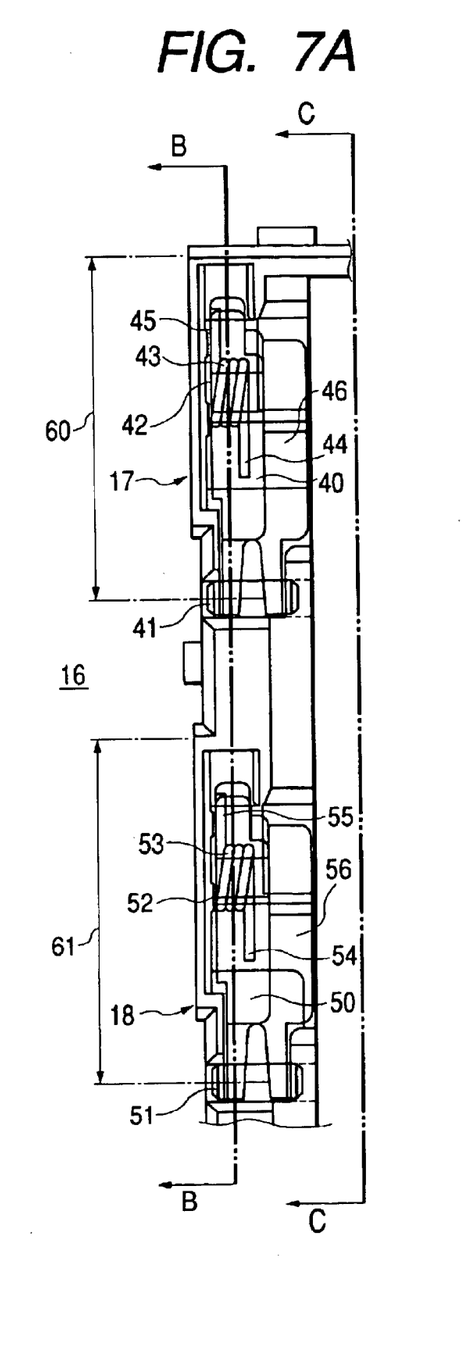
FIGS. 7A and 7B are views showing a switch mechanism provided in the embodiment, FIG. 7A being a plan view showing an essential part, and FIG. 7B being a cross sectional view taken along the line B—B in FIG. 7A and showing a state, in which both of a first switch for detecting that the cards have been mounted and a second switch for detecting inhibition of writing on the cards are made OFF.
Figure 7B:
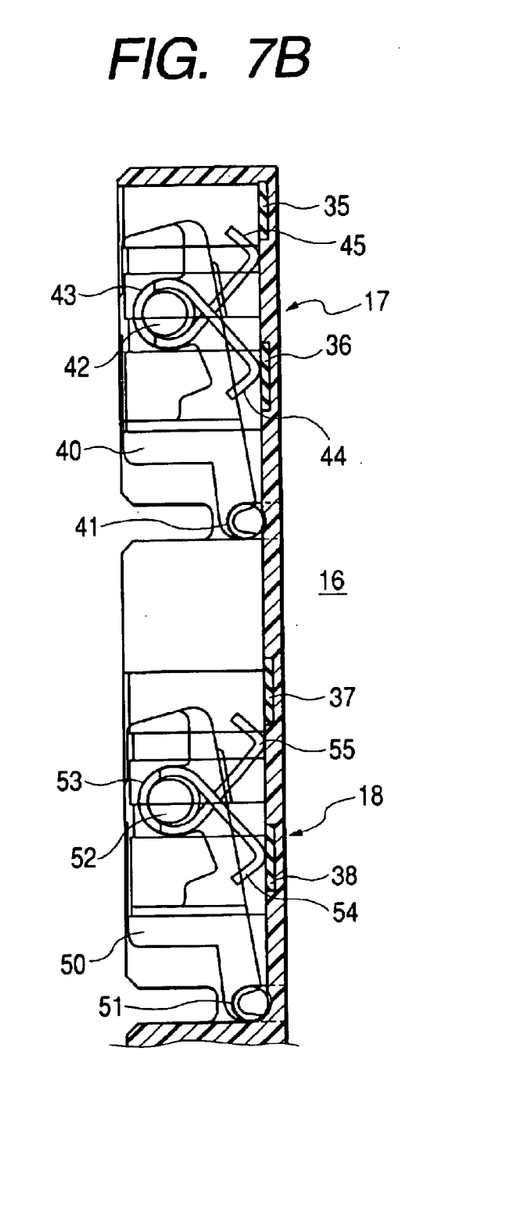
Figure 8A:
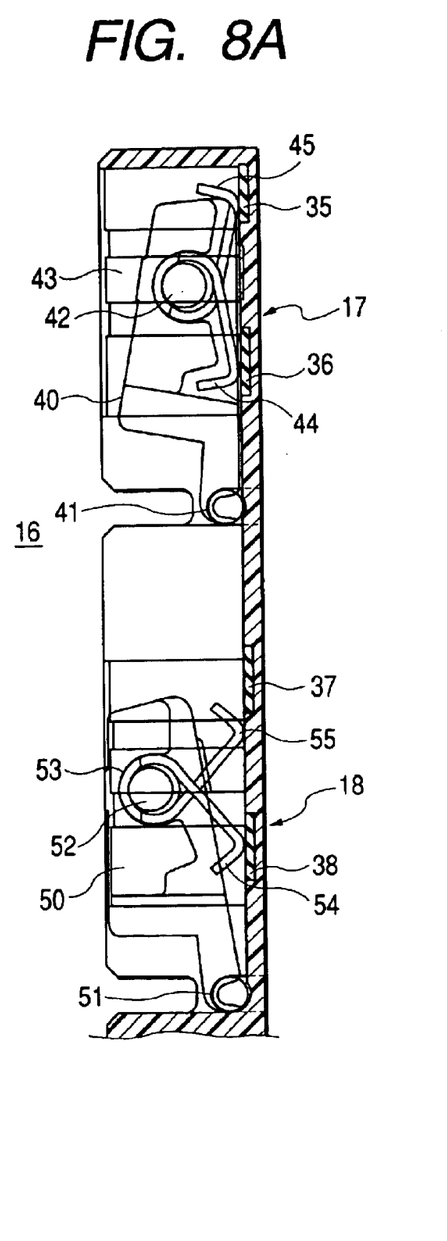
Figure 8B:
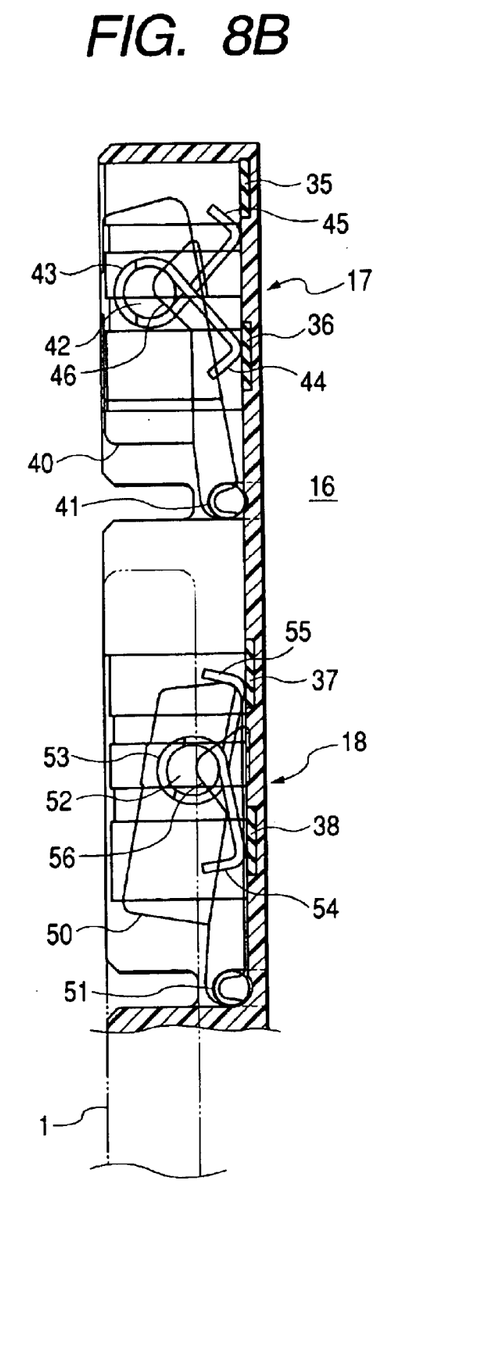

FIGS. 7 and 8 are views showing a switch mechanism provided in the embodiment. FIG. 7A is a plan view showing an essential part, and FIG. 7B is a cross sectional view taken along the line B—B in FIG. 7A and showing a state, in which both the first switch 17 and the second switch 18 are made OFF. FIG. 8A is a side, cross sectional view taken along the line B—B in FIG. 7A and showing a state, in which the first switch 17 is made ON and the second switch 18 is made OFF, and FIG. 8B is a side, cross sectional view taken along the line C—C in FIG. 7A and showing a state, in which the first switch 17 is made OFF and the second switch 18 is made ON.

With the embodiment, the first switch 17 for detecting that the first card 1 and the second card 5 have been mounted in the predetermined mount positions comprises a fixed contact provided on the housing and shown in, for example, FIGS.

6A and 6B. The fixed contact includes contact portions 35, 36 arranged in opposition to each other at a predetermined spacing therebetween. Also, the second switch 18 for detecting inhibition of writing on the first card 1 and the second card 5 comprises fixed contacts provided on the housing and shown in shown in FIGS. 6A and 6B. The fixed contact includes contact portions 37, 38 arranged in opposition to each other at a predetermined spacing therebetween.

Also, with the embodiment, the first switch 17 for detecting that the first card 1 and the second card. 5 have been mounted in the predetermined mount positions comprises a moving contact, that is, a torsion coil spring 43 shown in FIGS. 7A and 7B, which acts as the first card 1 and the second card 5 are moved to the predetermined mount positions. One end 44 of the torsion coil spring 43 is positioned to constantly contact with, for example, the contact portion 36. The other end 45 is maintained in a state of non-contact with the contact portion 35 when the torsion coil spring 43 is not in an expanded position, and positioned to contact with the contact portion 35 when the torsion coil spring 43 is expanded as the first card 1 and the second card 5 are moved to the predetermined mount positions.

The torsion coil spring 43 included in the first switch 17 is held by an actuator member 40 made of a resin, as shown in FIGS. 7A and 7B. That is, the actuator member 40 comprises a shaft 42 holding thereon the torsion coil spring 43. Also, as shown in FIG. 8B, the actuator member comprises a slope 46 pushed by the first card 1 and the second card 5 and is supported by a pin 41 mounted on the housing. The pin 41 forms support means for supporting the actuator member 40 vertically swingably.

The second switch 18 for detecting inhibition of writing on the first card 1 and the second card 5 also comprises a moving contact similar to that described above. That is, the second switch comprises a moving contact comprised of a torsion coil spring 53 shown in FIGS. 7A and 7B. One end 54 of the torsion coil spring 53 is positioned to constantly contact with, for example, the contact portion 38. The other end 55 is maintained in a state of non-contact with the contact portion 37 when the torsion coil spring 53 is not in an expanded position, and positioned to contact with the contact portion 37 when the torsion coil spring 53 is expanded in a state, in which the protect button 4 on the first card 1 and the second card 5 is in a write inhibit state.

The torsion coil spring 53 included in the second switch 18 is held by an actuator member 50 made of a resin, as shown in FIGS. 7A and 7B. That is, the actuator member 50 comprises a shaft 52 holding thereon the torsion coil spring 53. Also, as shown in FIG. 8B, the actuator member comprises a slope 56 pushed by the protect button 4 on the first card 1 and the second card 5 operated in a write inhibit state, and is supported by a pin 51 mounted on the housing. The pin 51 forms support means for supporting the actuator member 50 vertically swingably.

An operation of the embodiment constructed in this manner will be described below.

Standby State Before Card Insertion

Before the first card 1 or the second card 5 is inserted, the slider 12 is based toward the card insertion slot 10 by the bias member 13 as shown in, for example, FIG. 2. The pin 21 of the slide member 22 connected to the slider 12 is correspondingly held in a standby position in the heart-shaped cam groove 23.

Also, with a switch in the switch mechanism 16, for example, the first switch 17 for detecting that the first card 1 and the second card 5 have been mounted in the predetermined mount positions, one end 44 of the torsion coil spring 43 constituting a moving contact contacts with the contact portion 36, and the other end 45 is distant from the contact portion 35 as shown in FIG. 7B. Accordingly, no continuity is provided between the contact portions 35, 36. Likewise, with the second switch 18 for detecting inhibition of writing on the first card 1 and the second card 5, one end 54 of the torsion coil spring 53 contacts with the contact portion 38, and the other end 55 is distant from the contact portion 37. Accordingly, no continuity is provided between the contact portions 37, 38.

Mount Operation of the First Card 1 (When Write is Possible)

Now, let it be assumed that the protect button 4 on the first card 1 formed at the side edge thereof with the recess 2 is maintained in a state not operated to the write inhibit side, and writing on the first card 1 is made possible.

In this manner, when the first card 1 in a state affording writing of data is inserted from the card insertion slot 10 as shown in FIG. 2 and pushed in further toward the inner side of the device, the notch 3 formed in the corner on the front end of the first card 1 engages with the slope 20 of the slider 12 and the slider 12 together with the first card 1 moves toward the inner side of the device against the bias of the bias member 13. Such movement of the slider 12 causes the pin 21 of the slide member 22, which constitutes the lock mechanism 14, to be guided along the forward path 24 in the heart-shaped cam groove 23.

In addition, for example, at the time of insertion of the first card 1, the projection 27 of the engagement elastic member 15, which is cantilevered on the slider 12, engages with the recess 2 of the first card 1 and the first card 1 is held through the engagement elastic member 15 by the slider 12 as shown in FIG. 2.

When the first card 1 approaches the predetermined mount position, it engages with the slope 46 of the actuator member 40, which holds the torsion coil spring 43 of the first switch 17. A pushing force applied on the first card 1 turns the actuator member 40 downwardly against the spring force of the torsion coil spring 43 as shown in FIG. 8A. Accordingly, both ends of the torsion coil spring 43 are expanded as the actuator member 40 turns, so that one end 44 of the torsion coil spring 43 is maintained in a state of contacting with the contact portion 36, and the other end 45 contacts with the contact portion 35.

When the pushing force on the first card 1 is released in a state, in which the pushing operation of the first card 1 described above displaces the slider 12 to the innermost end of the device in overstroke, the bias of the bias member 13 returns the slider 12 slightly toward the card insertion slot 10. In the meantime, the pin 21 of the slide member 22 moving together with the slider 12 moves to the lock 26 from the forward path 24 in the heart-shaped cam groove 23 to be latched by the lock 26. Thereby, the first card 1 reaches the predetermined mount position and the slider 12 is locked.

In this state, continuity is provided through the torsion coil spring 43 of the first switch 17 between the contact portions 35, 36 to provide an ON state therebetween. That is, the first switch 17 outputs a signal detecting that the first card 1 has been mounted in the predetermined mount position.

In the predetermined mount position, a connection member (not shown) provided on a back surface of the first card 1 and the terminal members 11 shown in FIG. 1 are maintained in a contact state. Accordingly, transmission and reception of signals including the operation of writing on the first card 1 are made possible.

In addition, while the first card 1 is thus held in the predetermined mount position, the second switch 18 is maintained in an OFF state as shown in FIG. 8A. More specifically, since the protect button 4 on the first card 1 is not operated to the write inhibit side, the protect button 4 on the first card 1 does not engage with the actuator member 50. Accordingly, the actuator member 50 is held in an upper position, that is, a standby position, and the other end 55 of the torsion coil spring 53 on the second switch 18 is maintained in a state away from the contact portion 37.

Also, in a state, in which the first card 1 is held in the predetermined mount position, the free end 32 of the engagement elastic member 15 engaging with the recess 2 of the first card 1 is positioned to be opposed to the wall portion 30 as shown in FIGS. 3A and 3B. Accordingly, the free end 32 abuts against the wall portion 30 to prevent such movement of the engagement elastic member 15. That is, the engagement elastic member 15 is held in a restrained state by the wall portion 30 in a manner to be prevented from separating from the recess 2 of the first card 1.

Ejecting Operation of the First Card 1

In the ejecting operation of the first card 1, an operation is executed to push the first card 1 again. More specifically, a push/push type operation is formed to push the first card 1 at the time of insertion and to push the first card 1 again at the time of ejection.

As described above, when the first card 1 is again pushed in up to the innermost end of the device in overstroke from a state, in which the first card 1 is held in the predetermined mount position, the pin 21 of the slide member 22, which constitutes the lock mechanism 14, gets out of the lock 26 in the heart-shaped cam groove 23 to move to the rearward path 25. Thereby, locking of the slider 12 is released and the slider 12 is moved toward the card insertion slot 10 by the bias of the bias member 13. Such movement of the slider 12 causes the first card 1 to be pushed out to the predetermined ejection position shown in FIG. 2.

In the meantime, the projection 27 of the engagement elastic member 15 is held in a state, in which it engages with the recess 2 of the first card 1. Also, with movement of the slider 12 in the ejecting direction, the pin 21 of the slide member 22 connected to the slider 12 is guided along the rearward path 25 in the heart-shaped cam groove 23 to be returned to the standby position.

Also, with movement of the slider 12, the first card 1 moves to thereby remove a pressing force having been applied to the slope 46 of the actuator member 40, so that the actuator member 40 is turned upward by the spring force of the torsion coil spring 43 to return to the standby position shown in FIG. 7B. Accordingly, the other end 45 of the torsion coil spring 43 separates from the contact portion 35 to make the first switch 17 in an OFF state.

The first card 1 having been returned to the predetermined eject position can be easily pulled out from the card insertion slot 10. For example, with the pulling-out operation, the projection 27 of the engagement elastic member 15 separates from the recess 2 of the first card 1. At this time, the engagement elastic member 15 displaces in a direction away from the first card 1 and there is provided nothing for impeding displacement of the engagement elastic member 15 in the predetermined eject position. Accordingly, it is possible to pull out the first card 1 without hindrance.

Mount Operation of the First Card 1 (When Write is Inhibited)

For example, let it be assumed that the protect button 4 on the first card 1 formed at the side edge thereof with the recess 2 is operated to the write inhibit side and writing on the first card 1 is inhibited.

The mount operation of the first card 1 put in such state is the same as the mount operation described above except the operation of detecting inhibition of writing. Accordingly, only the operation of detecting inhibition of writing will be described below.

When the first card 1, of which the protect button 4 has been operated to the write inhibit side, is inserted from the card insertion slot 10 to be pushed to the inner side of the device, the protect button 4 on the first card 1 engages with the slope 56 on the actuator member 50, which is provided in association with the second switch 18. A pushing force applied on the first card 1 turns the actuator member 50 downwardly through the protect button 4 on the first card 1 against the spring force of the torsion coil spring 53 as shown in FIG. 8B.

Accordingly, both ends of the torsion coil spring 53 are expanded as the actuator member 50 turns, so that one end 54 of the torsion coil spring 53 is maintained in a state of contacting with the contact portion 38, and the other end 55 contacts with the contact portion 37 as shown in FIG. 8B. Thereby, continuity is provided between the contact portions 37, 38 to provide an ON state therebetween. More specifically, a signal detecting inhibition of writing on the first card 1 is output from the second switch 18, for example, at a predetermined time before or after completion of mounting of the first card 1 in the predetermined mount position.

Also, at the time of ejection of the first card 1, movement of the first card 1 concurrently with movement of the slider 12 toward the card insertion slot 10 removes a pressing force on the slope 56 of the actuator member 50 and the spring force of the torsion coil spring 53 turns the actuator member 50 upward to return the same to a standby state shown in FIG. 7B. Accordingly, the other end 55 of the torsion coil spring 53 separates from the contact portion 37 and the second switch 18 is made OFF.

Mount Operation of the Second Card 5 (When Write is Possible)

Now, let it be assumed that a protect button (not shown) on the second card 5 not formed at the side edge thereof with any recess is maintained in a state not operated to the write inhibit side, and writing on the second card 5 is made possible.

In this manner, when the second card 5 in a state affording writing of data is inserted from the card insertion slot 10 as shown in FIG. 4 and pushed in further toward the inner side of the device, the notch 6 formed in the corner on the front end of the second card 5 engages with the slope 20 of the slider 12 and the slider 12 together with the second card 5 moves toward the inner side of the device against the bias of the bias member 13. Such movement of the slider 12 causes the pin 21 of the slide member 22, which constitutes the lock mechanism 14, to be guided along the forward path 24 in the heart-shaped cam groove 23.

In addition, at the time of insertion of the second card 5, the projection 27 of the engagement elastic member 15, which is cantilevered on the slider 12, engages, as shown in FIG. 4, with that side edge 33 of the second card 5, which is not formed with any recess. Thereby, the engagement elastic member 15 is displaced against its own spring force in a direction away from the second card 5. This displacement causes the notch 31 provided on the engagement elastic member 15 to be moved together with the wall portion 30 to be positioned in a position opposed to the wall portion 30, that is, on the same straight line along the direction of card taking-out and putting-in.

When the second card 5 approaches the predetermined mount position, the notch 31 on the engagement elastic member 15 is put in a state, in which it is disposed below the wall portion 30. Accordingly, the slider 12 moves toward the inner side of the device without interference between the engagement elastic member 15 and the wall portion 30.

Also, when the second card 5 approaches the predetermined mount position, the second card 5 engages with the slope 46 of the actuator member 40, which holds the torsion coil spring 43 of the first switch 17. A pushing force applied on the second card 5 turns the actuator member 40 as described above and both ends of the torsion coil spring 43 are expanded. Accordingly, one end 44 of the torsion coil spring 43 is maintained in a state of contacting with the contact portion 36, and the other end 45 contacts with the contact portion 35.

When the pushing force on the second card 5 is released in a state, in which the pushing operation of the second card 5 described above displaces the slider 12 to the innermost end of the device in overstroke, the second card 5 reaches the predetermined mount position and the slider 12 is locked in a manner described above.

In this state, continuity is provided through the torsion coil spring 43 of the first switch 17 between the contact portions 35, 36 to provide an ON state therebetween. That is, the first switch 17 outputs a signal detecting that the second card 5 has been mounted in the predetermined mount position.

In the predetermined mount position, a connection member (not shown) provided on a back surface of the second card 5 and the terminal members 11 shown in FIG. 1 are maintained in a contact state. Accordingly, transmission and reception of signals including the operation of writing on the second card 5 are made possible.

In addition, while the second card 5 is thus held in the predetermined mount position, the second switch 18 is maintained in an OFF state as described above.

Also, in a state, in which the second card 5 is held in the predetermined mount position, there comes out a state, in which a lower end of the wall portion 30 is received in the notch 31 on the engagement elastic member 15 as shown in FIGS. 5A and 5B. Accordingly, the free end 32 of the engagement elastic member 15 is put in a state, in which it is set free outwardly of the wall portion 30. That is, that restraint on the engagement elastic member 15, which is laid by the wall portion 30, is maintained in a released state.

Ejecting Operation of the Second Card 5

The ejecting operation of the second card 5 is executed in the same manner as that of the first card 1 described above.

More specifically, when the second card 5 is pushed in up to the innermost end of the device from a state, in which the second card 5 is held in the predetermined mount position, locking of the slider 12 is released and the slider 12 is moved toward the card insertion slot 10 by the bias of the bias member 13. Such movement of the slider 12 causes the second card 5 to be pushed out to the predetermined ejection position shown in FIG. 4.

In the meantime, while the notch 31 on the engagement elastic member 15 passes below the wall portion 30, the engagement elastic member 15 moves concurrently with movement of the slider 12 in the ejecting direction. Also, with movement of the slider 12, the pin 21 of the slide member 22 connected to the slider 12 is guided along the rearward path 25 in the heart-shaped cam groove 23 to be returned to the standby position.

When with movement of the slider 12 the second card 5 moves to thereby remove a pressing force having been applied to the slope 46 of the actuator member 40, the first switch 17 is put in an OFF state as described above.

In this manner, the second card 5 having been returned to the predetermined eject position can be easily pulled out from the card insertion slot 10.

Mount Operation of the Second Card 5 (When Write is Inhibited)

For example, let it be assumed that a protect button (not shown) on the second card 5 not formed at the side edge thereof with any recess is operated to the write inhibit side and writing on the second card 5 is inhibited.

The mount operation of the second card 5 put in such state is the same as the mount operation of the first card 1 having been subjected to the write inhibit processing described above.

More specifically, when the second card 5, of which a protect button (not shown) has been operated to the write inhibit side, is inserted from the card insertion slot 10 to be pushed to the inner side of the device, the protect button on the second card 5 engages with the slope 56 on the actuator member 50, which is provided in association with the second switch 18. A pushing force applied on the second card 5 turns the actuator member 50 downwardly through abutting with the protect button as shown in FIG. 8B, and both ends of the torsion coil spring 53 are expanded. Accordingly, one end 54 of the torsion coil spring 53 is maintained in a state of contacting with the contact portion 38 and the other end 55 contacts with the contact portion 37 whereby continuity is provided between the contact portions 37, 38 to provide an ON state therebetween.

Also, at the time of ejection of the second card 5, movement of the second card 5 concurrently with movement of the slider 12 toward the card insertion slot 10 removes a pressing force on the slope 56 of the actuator member 50 and the actuator member 50 is turned upward to return to the standby state shown in FIG. 7B. Accordingly, the second switch 18 is made OFF.

In the embodiment constructed in this manner, the restraint portion, that is, the wall portion 30 lays restraint on movements of the engagement elastic member 15 in a state, in which the first card 1 formed at the side edge thereof with the recess 2 is held in the predetermined mount position. Thereby, separation of the engagement elastic member 15 from the recess 2 of the first card 1 is restrained whereby the first card 1 can be firmly held in the predetermined mount position.

Also, when the second card 5 not formed at the side edge 33 thereof with the recess 2 is inserted, the restraint release means provided on the engagement elastic member 15, that is, the notch 31 releases that restraint on the engagement elastic member 15, which is laid by the wall portion 30. Accordingly, when the engagement elastic member 15 contacts with the side edge 33 of the second card 5, the engagement elastic member 15 is displaced against its own spring force in a direction away from the second card 5 by a pushing force applied on the second card 5 whereby it is possible to prevent plastic deformation of the engagement elastic member 15.

In this manner, when the first card 1 is mounted in the predetermined mount position, the first card 1 is firmly held, and when the second card 5 is inserted, plastic deformation of the engagement elastic member 15 can be prevented, so that it is possible to ensure high reliability in the device.

Also, with the embodiment, the restraint portion is composed of the wall portion 30 provided on the housing, and the restraint release means is composed of the allowance means for allowing the free end 32 of the engagement elastic member 15 to move outwardly of the wall portion 30, that is, the notch 31 formed on the engagement elastic member 15. The wall portion 30 described above can be manufactured simultaneously with manufacture of the housing, and the notch 31 can be manufactured simultaneously with manufacture of the engagement elastic member 15. Accordingly, manufacture is easy and any increase in the number of parts is not caused. Thereby, it is possible to hold down manufacturing cost.

Also, the embodiment comprises the lock mechanism for locking the slider 12 against the bias of the bias member 13 when the first card 1 and the second card 5 have reached predetermined mount positions. Thereby, it is possible to stably hold the first card 1 and the second card 5 in the predetermined mount positions, which contributes to ensuring reliability in the device.

Also, with the embodiment, the lock mechanism described above comprises the slide member 22 swingably provided on the slider 12 and having the pin 21, and the heart-shaped cam groove 23, in which the pin 21 of the slide member 22 is guided. Since the slide member 22 having the pin 21 and the heart-shaped cam groove 23 are simple in structure, manufacture thereof is easy. Accordingly, this contributes to holding-down in manufacturing cost.

Also, with the embodiment, the first switch 17 for detecting that the first card 1 and the second card 5 have been mounted in predetermined mount positions, and the second switch 18 for detecting inhibition of writing on the first card 1 and the second card 5 are of a construction provided with no metallic sheet pieces, that is, a construction including the torsion coil springs 43, 53. It suffices that spring forces of the torsion coil springs 43, 53 be set taking account of wire diameter, number of turns, and so on. Accordingly, total lengths of the torsion coil springs 43, 53 can be set to short lengthwise dimensions 60, 61 as compared with relatively lengthy metallic sheet pieces as shown in FIG. 7A. Thereby, miniaturization can be realized in the device.

Further, it is possible to obtain predetermined spring forces with the torsion coil springs 43, 53 having small number of turns, that is, it is possible to set the torsion coil springs 43, 53 to small widthwise dimensions, and it is possible to set the slopes 46, 56 of the actuator members 40, 50, by which the torsion coil springs 43, 53 are expanded, to small widthwise dimensions. Based on this, it is possible to set the first switch 17 and the second switch 18 to relatively small widthwise dimensions, which also can realize miniaturization of the device.

Also, since the torsion coil springs 43, 53 constituting the first switch 17 and the second switch 18 can be fabricated by a simple work of such a degree of winding a wire rod in predetermined number of turns and cutting the same to a predetermined length, manufacturing cost can be held down as compared with metallic sheet pieces manufactured by the processing and work of a hoop material.

Also, the embodiment comprises the actuator members 40, 50 of resin, each of which holds a corresponding one among the torsion coil springs 43, 53 and with which the first card 1 and the second card 5 are engageable, and the torsion coil springs 43, 53, respectively, are expanded upon actuation of the actuator members 40, 50 caused by movements of the first card 1 and the second card 5. That is, since the first card 1 and the second card 5 are brought into contact with the actuator members 40, 50, which are made of a resin to be soft as compared with metal, it is possible to hold down wear of the first card 1 and the second card 5 caused by operation of the first switch 17 and the second switch 18.

Also, with the embodiment, the second switch 18 for detecting inhibition of writing on the first card 1 and the second card 5 and the first switch 17 for detecting that the first card 1 and the second card 5 have been mounted in predetermined mount positions are arranged linearly in the direction of card taking-out and putting-in. In particular, the second switch 18 is positioned on a side close to the card insertion slot 10, and the first switch 17 is positioned on a side distant from the card insertion slot 10. Thereby, the switch mechanism 16 can be arranged in a compact configuration in the direction of card taking-out and putting-in, thus contributing to miniaturization in the device.

As described above, the invention is constructed such that the switch for detecting that the cards have been mounted in predetermined mount positions includes a moving contact, which operates concurrently with movements of the cards to the predetermined mount positions, and the moving contact is composed of torsion coil springs. Accordingly, mounting of the cards in the predetermined mount positions can be detected without the provision of conventional metallic sheet pieces. The torsion coil springs can be set to small dimensions as compared with conventional metallic sheet pieces, which are relatively lengthy. Thereby, miniaturization can be realized in the device, which is conventionally difficult.

As described above, the invention is constructed such that the switch for detecting inhibition of writing on the cards includes a moving contact, which operates concurrently with movements of the cards to the predetermined mount positions, and the moving contact is composed of torsion coil springs. Accordingly, inhibition of writing on the cards can be detected without the provision of conventional metallic sheet pieces. As described above, the torsion coil springs can be set to small dimensions as compared with metallic sheet pieces. Thereby, miniaturization can be realized in the device.

What is claimed is:

1. A card connector device comprising a switch for detecting that cards have been mounted in predetermined mount positions, the switch comprising a fixed contact provided on a housing and a moving contact to act as the cards are moved to the predetermined mount positions, the moving contact comprising a torsion coil spring.

2. The card connector device according to claim 1, wherein the fixed contact comprises contact portions arranged in opposition to each other at a predetermined spacing therebetween, and as the cards are moved to the predetermined mount positions, both ends of the torsion coil spring are expanded to provide continuity between the contact portions.

3. The card connector device according to claim 2, further comprising an actuator member, which is made of a resin to hold the torsion coil spring and with which the cards are engageable, and wherein the torsion coil spring is expanded as actuation of the actuator member is caused by movements of the cards.

4. The card connector device according to claim 3, further comprising support means supporting the actuator member vertically swingably, and wherein the actuator member comprises a slope pushed by the cards.

5. A card connector device comprising a switch for detecting inhibition of writing on cards, the switch comprising a fixed contact provided on a housing and a moving contact to act as the cards are moved to the predetermined mount positions, the moving contact comprising a torsion coil spring.

6. The card connector device according to claim 5, further comprising a separate switch for detecting that the cards have been mounted in predetermined mount positions, the separate switch comprising a separate fixed contact provided on a housing and a separate moving contact to act as the cards are moved to the predetermined mount positions, the separate moving contact comprising a separate torsion coil spring.

7. The card connector device according to claim 6, wherein the switch for detecting inhibition of writing on cards and the separate switch are arranged linearly in a direction of card taking-out and putting-in, and wherein the switch for detecting inhibition of writing on cards is positioned on a side close to a card insertion slot and the separate switch is positioned on a side distant from the card insertion slot.

* * * * *